United States Patent [19]

Fujimoto et al.

[11] 4,102,842

[45] Jul. 25, 1978

[54] WATER-INSOLUBLE, HYDROPHILIC GELS AND A METHOD FOR THE PREPARATION OF THE SAME

[75] Inventors: Masanori Fujimoto, Ibaraki; Kozo Tsuji; Tsuneyuki Nagase, both of Takatsuki, all of Japan

[73] Assignee: Sumitomo Chemical Company, Limited, Osaka, Japan

[21] Appl. No.: 707,768

[22] Filed: Jul. 22, 1976

[30] Foreign Application Priority Data

Jul. 24, 1975 [JP] Japan .................................. 50-90850
Mar. 4, 1976 [JP] Japan .................................. 51-23761

[51] Int. Cl.$^2$ ............................................. C08L 29/02
[52] U.S. Cl. ..................... 260/29.6 PT; 260/29.6 AT; 260/29.6 B; 260/29.6 CM; 260/29.6 H; 526/11
[58] Field of Search .................... 526/11; 260/29.6 B, 260/2.5 R, 29.6 PT, 29.6 CM, 29.6 AT, 29.6 H

[56] References Cited

U.S. PATENT DOCUMENTS

| | | | |
|---|---|---|---|
| 2,506,537 | 5/1950 | Barnes et al. | 260/29.6 WB |
| 2,930,770 | 3/1960 | Wade | 260/2.5 R |
| 3,027,336 | 3/1962 | Götz et al. | 260/2.5 R |
| 3,053,785 | 9/1962 | Rosenbloom | 260/29.6 M |
| 3,505,264 | 4/1970 | Thoese et al. | 260/29.6 B |
| 3,530,080 | 9/1970 | Inskip | 260/29.6 H |
| 3,554,287 | 1/1971 | Eilers | 260/29.6 H |
| 3,663,462 | 5/1972 | Arndt et al. | 260/29.6 H |

FOREIGN PATENT DOCUMENTS

| | | |
|---|---|---|
| 601,324 | 12/1932 | Fed. Rep. of Germany. |
| 863,229 | 3/1961 | United Kingdom. |
| 692,324 | 6/1953 | United Kingdom. |
| 848,348 | 9/1960 | United Kingdom. |

*Primary Examiner*—Eugene C. Rzucidlo
*Attorney, Agent, or Firm*—Cushman, Darby & Cushman

[57] ABSTRACT

A less colored, water-insoluble, hydrophilic gel which is a saponified product of the copolymer of a vinyl ester and an ethylenically unsaturated carboxylic acid or derivatives thereof, is prepared by drying said saponified product in a hydrated state. This gel is useful as an absorbent polymer material.

34 Claims, No Drawings

WATER-INSOLUBLE, HYDROPHILIC GELS AND A METHOD FOR THE PREPARATION OF THE SAME

The present invention relates to a water-insoluble, hydrophilic gel having an ability to absorb a large amount of water and a method for the preparation thereof.

As application of hydrophilic polymer materials to the medical industry, food industry or agricultural fields has recently advanced, water-insoluble and hydrophilic or water-absorbing polymeric materials have begun to be used as materials for separation and purification such as various membranes and carriers for liquid chromatography, as enzyme supporting materials, as culturing materials for microorganisms or plants, and medical materials such as contact lens and suture-protective materials; and as materials requiring water absorbability and water retentivity. Among those uses, particularly in the application fields which make use of water absorbability and water retentivity, it is desired for the polymer materials to absorb as large an amount of water as possible in a short period of time when they are brought into contact with water. The well-known methods for the preparation of such polymeric materials are, for example, crosslinking of water-soluble polymers with a crosslinking agent, or modifying the water-soluble polymers to water-insoluble ones by partial substitution of the hydrophilic groups with hydrophobic ones. In the crosslinking above, degree of crosslinking and water-absorbing ability are opposed to each other. As the crosslinking degree is increased with an increase of an amount of a crosslinking agent, the water-absorbing ability reduces. Therefore, in order to obtain a useful water-absorbing material, it is necessary to keep the reaction under severe control so that the crosslinking degree is minimized within the allowable range and, at the same time, the reaction proceeds uniformly. Furthermore, since a crosslinking agent is used in the reaction, there occur various problems in the products, for example, workability or leaving a part of the crosslinking agent unaltered.

Hitherto, there have been proposed several materials which are made of natural or synthetic polymer substances, for example crosslinked products of polyethylene oxide, polyacrylic acid, polyacrylamide, polyvinyl pyrrolidone or sulfonated polystyrene; cellulose derivatives; and saponified products of starch-acrylonitrile graft copolymers. However, with the exception of the saponified products of starchacrylonitrile graft copolymers, these materials are low in the water-absorbing ability and unsatisfactory as a water-absorbent material. The saponified products of starchacrylonitrile graft copolymers, however, have a number of drawbacks in that, for example, methods for preparing the same, even after various improvements have been made, are relatively troublesome and, when they are used in a hydrated state for a long time, the starch component rots and the gel structure is broken. The term "hydrated" referred to herein means "contain water" hereinafter.

Copolymers comprising a vinyl ester and an ethylenically unsaturated carboxylic acid or derivative thereof, and methods for the preparation thereof are well-known. It is also well known that water-soluble copolymers can be obtained by saponification of said copolymers (for example, "Kobunshi Kagaku", Vol. 7, pp 142, 1950). Furthermore, conventional saponified copolymers are only used for adhesives, paperconverting agents, paints, coating materials and modifiers for polyvinyl alcohol.

The present inventors extensively studied the properties of copolymers which contain, as essential components, at least vinyl alcohol and an ethylenically unsaturated carboxylic acid and/or alkali salt thereof. As a result, it has been found that water-insoluble, hydrophilic gels extremely useful as a water-absorbent material can be obtained by merely drying the saponified products, which are in a hydrated state and water-soluble, of copolymers comprising a vinyl ester and an ethylenically unsaturated carboxylic acid or derivative thereof. In other words, the aforesaid saponified copolymers gain the property of a gel having an ability to absorb an unexpectedly large amount of water, when they are modified into a waterinsoluble substance, and said saponified copolymers are modified into gels which are water-insoluble and at the same time absorb a large amount of water, by a mere drying of said copolymers which are in a moderately hydrated state. It was not expected at all that these water-soluble, saponified copolymers can be converted into materials which are waterinsoluble and at the same time have an ability to absorb an extremely large amount of water, by merely drying said saponified products which are in a hydrated state.

These gels of the present invention are highly swellable, less colored, hydrophilic gel which have the following properties:

water absorption ability (weight of said gel after saturation absorption of water/weight of dry said gel): 10 to 1500, preferably 50 to 1000;

the product of strength of said gel after saturation absorption of water and water absorption ability: $5 \times 10^4$ to $20 \times 10^4$ (g/cm$^2$); and water retentability, defined as in the formula below: more than 0.6. Water retentability = 1 − (weight of water removed by centrifugation at 160G and during 10 minutes/weight of water contained in said gel after saturation absorption of water).

The term "water-insoluble" referred to herein means that the amount of dissolved gel is less than 0.01 parts, when 1 part of the gel is dipped in 10,000 parts of water.

An object of the present invention is to provide less colored, water-insoluble, hydrophilic gels.

Another object of the present invention is to provide less colored, water-insoluble, hydrophilic gels which absorb water and the like.

A further object of the present invention is to provide less colored, water-insoluble, hydrophilic gels which can absorb as large an amount of water as 10 to some hundreds times their own weight.

A still further object of the present invention is to provide less colored, water-insoluble hydrophilic gels which can preferably be used as water-absorbent materials or as hydrophilic gel materials which are used in a hydrated, highly swollen state.

A still further object of the present invention is to provide absorbent materials which do not rot even when used in a hydrated state for a long time.

A still further object of the present invention is to obtain less colored gels which are water-insoluble and at the same time can absorb a large amount of water, using no crosslinking agent but by a mere drying of said saponified copolymers which are in a moderately hydrated state.

A still further object of the present invention is to provide a method which is extremely advantageous in terms of complete freedom from the various above-described problems encountered in the crosslinking methods.

Other and further objects, and advantages of the present invention will become apparent from the following description.

The starting materials of the present invention are copolymers of a vinyl ester and an ethylenically unsaturated carboxylic acid or derivative thereof, preferably, having an intrinsic viscosity in benzene at 30° C of at least 1.5. They can be synthesized, for example, by radical copolymerization using a polymerization initiator, for example peroxides (e.g. di-tert-butyl peroxide, benzoyl peroxide), persulfates (e.g. ammonium persulfate) or azo compounds (e.g. azobisisobutyronitrile).

The amount of the ethylenically unsaturated carboxylic acid or derivative thereof in the starting copolymers largely influences the gel-formation property and water-absorbing ability of the present absorbent polymeric materials. The amount of the ethylenically unsaturated carboxylic acid or derivative thereof in said copolymers should be within the range of 5 to 95 mole %, preferably 20 to 80 mole %, most preferably 30 to 70 mole %. When the amount of the ethylenically unsaturated carboxylic acid or derivative thereof is too low, the gels obtained become very low in the water-absorbing ability and moreover do not become water-insoluble. On the other hand, when the amount is too high, the gel strength in a highly hydrated state tends to reduce to an extreme degree.

The vinyl esters used for the preparation of said copolymers include preferably vinyl esters of saturated carboxylic acids, for example, vinyl acetate, vinyl propionate and vinyl stearate. Among them, vinyl acetate is most preferred. The ethylenically unsaturated carboxylic acids or derivatives thereof include acrylic acid, methacrylic acid, crotonic acid, itaconic acid, maleic acid, fumaric acid, maleic anhydride, itaconic anhydride, esters thereof, acrylamide, methacrylamide and the like. Preferred carboxylic compounds are acrylic acid, methacrylic acid, methyl-, ethyl-, n-propyl-, iso-propyl-, n-butyl- and tert-butyl-esters thereof, acrylamide and methacrylamide. At least one of the carboxylic acid compounds moiety is enough for the copolymers.

The present gels are prepared from said starting copolymers by saponifying said copolymers and drying the saponified products. The most preferred embodiment of the method is (a) saponifying said copolymers with an alkali to prepare copolymers having at least a hydroxyl group and a carboxylato group, (b) adjusting the resulting aqueous solutions of the saponified copolymers to pH 3 thereby to precipitate said saponified copolymers, and then isolate them, (c) re-adjusting the isolated copolymers to pH about 4 to 12 thereby to prepare an aqueous solution of the copolymers, and (d) drying said aqueous solution until the water content to the copolymers is less than 100% by weight.

The above method will be described in more detail.

SAPONIFICATION

Any process may be used. A method using a suitable alkali substance in an alcohol solvent is preferred, however water or water-alcohol mixtures may be used as a solvent. The alkali substances include, for example, alkali metal hydroxides or alcoholates, for example, sodium hydroxide, potassium hydroxide, sodium methylate, sodium ethylate, and potassium methylate. When the saponification is carried out using water, preferred alkali substances are alkali metal hydroxides.

It is necessary for the saponified copolymers to have at least one hydroxyl group and one carboxylato group in the molecules thereof. In order to obtain water-insoluble, highly absorbent gels, the saponification degree is 50 mole % or more, preferably at least 90 mole % of the vinyl ester component in said copolymers and 30 mole % or more, preferably at least 70 mole % of the ethylenically unsaturated carboxylic ester component, when the carboxylic acid moiety is in the form of an ester. Further, the range of saponification degree of acrylamide, methacrylamide or the like is similar to that of esters above described.

The term "saponification" referred to herein includes not only saponification of esters but also a hydrolysis reaction which converts amides and the like into carboxylic acids and/or alkali salts thereof.

The water-absorbing ability of the gels according to the present invention is largely influenced not only by the components moiety, compositions or saponification degrees of the starting copolymers, but also by the neutralization degree of the ethylenically unsaturated carboxylic acid moiety. That is, the ability becomes the highest when the ethylenically unsaturated carboxylic acid moiety is completely neutralized with an alkali. The ability is lower, as the neutralization degree reduces. This means that the water-insoluble, hydrophilic gel having various water-absorbing abilities can be obtained by varying the neutralization degree of the ethylenically unsaturated carboxylic acid component. Consequently, as for the saponified copolymers used in the present invention, the neutralization degree of the ethylenically unsaturated carboxylic acid moiety is not particularly critical. In order to raise the degree of water absorbability, however, it is desirable that all or substantially all of the acid component in the copolymer has been converted into an alkali salt. In this case, the alkali salts include alkali metal salts such as sodium salt and potassium salt, ammonium salts and amine salts described hereinafter.

The saponified copolymers are obtained in the form of powder, granule, lump or an aqueous solution. When the copolymers are in the form of powder, granule or lump, water is added until they are plasticized with, dissolved in or dispersed in water.

ISOLATION

This step is not essential, but preferred. In this step, the aforesaid saponified copolymers are first isolated as water-insoluble precipitates by acidifying the aqueous solution of the saponified copolymer until the pH reaches about 3 or less.

Said isolation operation is very important as it brings about the following advantages. That is, in comparison with the method wherein the aqueous solution obtained by saponification is dried as it is without said isolation operation, this method including the isolation process provides polymer materials which are far superior in both the waterabsorbing ability and the gel strength at a highly hydrated state. Further, when the saponification is carried out in an aqueous solvent, the saponified copolymers can be isolated from the aqueous solution without a large amount of a poor solvent.

In some cases, the saponified copolymers separated at the isolation stage may have a molecular structure containing not only an acid form but also a lacetone ring form, in part, however they can be used without problem.

WATER-SOLUBILIZING

This step is only effected when the isolation step is carried out.

The copolymer thus isolated is again converted into an aqueous solution or dispersion thereof by re-adjusting the pH to 4 to 12, preferably 5 to 8.

The alkali substances used for the pH-adjustment include alkali metal hydroxides (e.g. sodium hydroxide and potassium hydroxide), ammonium hydroxide, mono-, di- and tri-methylamine, mono-, di- and tri-ethylamine, mono-, di-and tri-isopropylamine, mono-, di- and tri-ethanolamine, mono-, di- and tri-isopropanolamine, N,N-dimethylethanolamine, N,N-dimethylisopropanolamine, N,N-diethylethanolamine, N,N-diethylisopropanolamine, N-methylethanolamine, N-methylisopropanolamine, N-ethylethanolamine, cyclohexylamine, benzylamine, aniline, pyridine and other organic amines.

In said pH-adjustment, the alkali substance is generally added to the aqueous solution or dispersion of the isolated saponified copolymer. However, since the aqueous solution or dispersion is very viscous, it is desirable to carry out the step in the presence of a large amount of water and/or in a suitable mixer having a high kneading effect. By this operation, the carboxylic acid component of the saponified copolymer is converted into an alkali salt.

Alternatively, the isolated saponified copolymer may be brought into contact with ammonia gas for a long enough time to form an ammonium salt.

DRYING

The saponified, hydrated product with or without the above isolation and water-solubilizing steps is finally dried.

Any method is used for the drying, for example, spreading the aqueous solution or dispersion of the saponified copolymer into a layer and then drying. Alternatively and preferably, the copolymer of a relatively low hydrated state is molded in an optional shape on a molding machine and then drying. In either case, the drying is carried out according to air-drying at room temperature, hot air drying, vacuum drying or freeze-drying. In general, a drying temperature of 50° C or higher is desirable in order to shorten the drying time. When the saponified copolymer is of a volatile salt type, for example, ammonium salts or organic amine salts, the drying temperature range should not allow the ammonia or organic amine to be released.

The water content of the saponified copolymer to be subjected to the drying is not particularly limited, as long as it is larger than 100% by weight. Generally, the water content is sufficient enough to allow the copolymer to be plasticized or dissolved.

The copolymer is dried to a water content of less than 100% by weight, preferably 50% by weight or less, based on the copolymer. When the water content is outside this range, the copolymer does not become water-insoluble or becomes extremely low in the gel strength in a hydrated state. The water content referred to herein is as defined below.

Water content (%) =

$$\frac{\text{weight of water (g)}}{\text{weight of saponified copolymer (g)}} \times 100$$

The thus obtained water-insoluble, hydrophilic gels of the present invention are transparent, less colored and generally have an ability to absorb water of from 10 to 1,500 times as much as their own weight. The water-absorbing ability varies depending on the vinyl ester, carboxylic acid, and salt-forming element or group employed, saponification and neutralization degrees and drying conditions. The ability is also influenced by the pH of water to be absorbed. The present gel works within the pH range of 5 - 12, and can absorb more than 500 times as much water as its own weight when the pH of the water is 8 - 11. The ability is reduced as the pH range is far away from this range, remarkably so at pH 5 or less.

The gels of the present invention are useful as an absorbent material which absorbs not only water but also other liquids. For example, when the gels are of an organic amine salt type, they exhibit an excellent absorbing ability even for mixed solvents of water and an organic solvent, for example water-alcohol and water-acetone.

The water absorbing ability once lost in an acidic water can be recovered in full, however, when the gel is transferred from the acidic liquor to an alkali liquor. Further, highly hydrated gels release a large amount of water when a salt such as sodium chloride is added to the gels. In other words, the gel shows a water absorption/water release reversible change depending upon the pH value and the salt concentration of the water.

The absorbent polymer materials of the present invention have the following advantages.

Firstly, the absorbent polymer materials are transparent, less colored and non-toxic. Therefore, they are expected to be usable without problems in the fields of application wherein contact between the materials and the human body is not avoidable, for example medical supplies such as disposable diapers, tampons, sanitary cotton, bandages and napkins. Secondly, there is not fear of the materials rotting, even when they are used in a hydrated state for a long time. Consequently, they are preferably used for industrial uses such as a water-absorber for water-containing oils, other dehydrating agents and drying agents, and for a water-retaining agent for plants and soils and other uses requiring water absorbency or water retentivity. Thirdly, the absorbent polymer materials are prepared very easily on an industrial scale and further they can be molded into optional shapes depending upon the intended use.

The gel of the present invention may be used in combination with coloring agents, perfumes, other additives, or organic or inorganic fillers, so far as the properties of the gel are not adversely affected. Furthermore, the gel may be used together with paper, fiber, cloth and other different materials.

The present invention will be illustrated in more detail with reference to the following examples, which are not intended to limit the present invention thereto.

The water absorption percentage or absorption percentage in the examples is defined as follows:

$$\text{Water absorption ability} = \frac{\text{weight of gel after saturation absorption of water or other liquids}}{\text{weight of dry gel}}$$
(absorption ability)

EXAMPLE 1

0.8 mole of vinyl acetate and 0.2 mole of methyl acrylate were copolymerized at 80° C for 2 hours in benzene in the presence of benzoyl peroxide. The thus obtained vinyl acetate-methyl acrylate copolymer had a methyl acrylate content of 43% by mole. Next, 10 g of the copolymer was dispersed in 500 ml of methanol with heating and then saponified at 60° C for 15 hours with addition of 20 ml of a 40 W/V % aqueous sodium hydroxide solution.

The saponified product was thoroughly washed in acetone to remove free sodium hydroxide and then dried under reduced pressure at 60° C for 20 hours. Thus the sodium salt of vinyl alcohol-acrylic acid copolymer was obtained in a powdery form. The saponification degree of the copolymer was 93 mole % from the amount of alkali consumed.

Five grams of the sodium salt thus obtained was dissolved in 200 ml of water and the viscous solution obtained was spread out on the glass plate, pre-dried at room temperature and then dried in an oven kept at 120° C for 1 hour. The water content after drying was 30% by weight.

The film obtained had the ability to absorb water of 420 times as much as its own weight and exhibited no change in the gel form even when dipped in excess water and allowed to stand for 2 months.

REFERENCE EXAMPLE 1

In the same manner as in Example 1, the copolymer in Example 1 was saponified and washed thoroughly with acetone to remove free sodium hydroxide. Thus the sodium salt of the copolymer was obtained in a water-free, powdery form. Thereafter, this sodium salt was dried as it was for 1 hour in an oven kept at 120° C. The product thus obtained was dissolved in water but did not form the gel having a water-absorbing function.

EXAMPLE 2

The saponified copolymer described in Example 1 was converted to an ammonium salt which was then dissolved in water. In the same manner as in Example 1, the aqueous solution was spread out on the glass plate and dried in two ways, one being at room temperature and the other being in an oven kept at 90° C. The water content after drying at room temperature was 50% by weight and that after drying at 90° C was 30% by weight.

The film dried at room temperature absorbed 570 times as much water as its own weight and the film dried at 90° C absorbed 460 times as much water. The stabilities of the gels in water were the same as that of the sodium salt.

EXAMPLE 3

A mixture of 60 g of vinyl acetate, 40 g of methyl acrylate and 0.5 g of benzoyl peroxide as a polymerization initiator was dispersed in 300 ml of water containing 3 g of partially saponified polyvinyl alcohol as a dispersion stabilizer. Then, suspension polymerization was carried out at 65° C for 6 hours. The copolymer obtained had a methyl acrylate content of 48 mole % and its intrinsic viscosity in benzene was 2.10 at 30° C.

Next, 8.6 g of the copolymer thus obtained was suspended in 230 ml of water and saponified at 80° C for 12 hours with addition of 70 ml of a 5-N aqueous sodium hydroxide solution. The aqueous solution thus obtained contained a saponified copolymer having a saponification degree of 98.3 mole %.

Said aqueous solution was acidified with dilute hydrochloric acid to a pH value of about 2, whereby the copolymer was precipitated. The precipitate was collected by filtration and washed with water to obtain a water-insoluble copolymer. The isolated, water-insoluble product was suspended in water and dissolved again by separately adding three kinds of alkali substance, sodium hydroxide, ammonium hydroxide and triethylamine, respectively, to obtain highly viscous, aqueous solutions. The pH values of the solutions were 7 to 8 (sodium salt) and 9 to 10 (ammonium salt and amine salt), respectively.

Each of the solutions thus obtained was spread out on the glass plate previously treated with a mold release agent and dried at room temperature to a water content of about 80%, to obtain a film 60 $\mu$ thick. A part of the films was further dried to a water content of 15% in an oven kept at 100° C.

All of the films thus obtained were water-insoluble and rapidly swelled in water, showing a very large degree of water-absorbing ability as indicated in Table 1. Furthermore, the films exhibited such a high gel strength as not to easily be broken even when violently stirred in water, and showed no change in the gel form even after being dipped in water for 2 months. The films dried at 100° C were inferior in water absorption percentage to those dried at room temperature, but they had extremely high gel strength in a hydrated state, showing desirable properties as an absorbent material.

Table 1

| Salt forming substance | Water absorption ability (g/g) | |
|---|---|---|
| | films dried at room temperature | films dried at 100° C |
| Sodium hydroxide | 1,100 | 810 |
| Ammonium hydroxide | 980 | 720 |
| Triethylamine | 800 | 480 |

EXAMPLE 4

The absorbent polymers obtained in Example 3 were tested for the absorption ability in water-organic solvent mixtures. The results are shown in Table 2. It is apparent from the table that the absorbent polymer of an amine salt type had excellent absorbing ability in aqueous solutions containing an organic solvent of more than 50%.

Table 2

| Aqueous solution | Salt forming substance Absorption ability (g/g) | | |
|---|---|---|---|
| | Sodium hydroxide | Ammonium hydroxide | Triethylamine |
| Water-ethanol mixture (water content 20%) | ~2 | ~2 | 170 |
| Water-acetone mixture (water content 20%) | ~2 | ~2 | 110 |

EXAMPLE 5

A mixture of 70 g of vinyl acetate and 30 g of methyl acrylate was added to 70 ml of benzene and the mixture obtained was polymerized at 80° C for 3 hours in the presence of 0.1 g of benzoyl peroxide as a polymerization initiator. The thus obtained copolymer had a methyl acrylate content of 50 mole % and its intrinsic viscosity in benzene was 1.9 (30° C). Next, 10 g of the copolymer was dispersed in 300 ml of methanol with heating and saponified at 60° C for 10 hours with addition of 50 ml of a 5-N aqueous sodium hydroxide solution. This saponified product was thoroughly washed with methanol, filtered and dried under reduced pressure to obtain a saponified copolymer powder. This copolymer had a saponification degree of 92 mole % and showed little or no absorption of the ester group but a strong absorption of $-COO^-$ at 1570 $cm^{-1}$ in the IR absorption spectrum.

This copolymer salt was dissolved in water and adjusted to pH of about 2 with addition of dilute sulfuric acid. The resulting water-insoluble copolymer was isolated in the same manner as in Example 1, suspended in water and then dissolved again in two ways by adding sodium hydroxide and monoethanolamine, respectively, as an alkali substance. The aqueous solution obtained with sodium hydroxide had a pH of about 8 and the other solution had a pH of about 9.

The aqueous solutions thus obtained were each spread out on a glass plate previously treated with a mold release agent and dried to a water content of 50% in a hot air drier kept at 60° C. Thus a transparent film was obtained.

The films obtained were water-insoluble and absorbed an extremely large amount of water as shown in Table 3, thus forming a gel having same stability as that of the gel in Example 1.

Table 3

| Salt forming substance | Water absorption ability |
|---|---|
| Sodium hydroxide | 800 |
| Monoethanolamine | 560 |

EXAMPLE 6

Using the powdery saponified copolymer obtained in the same manner as in Example 5, the aqueous solution thereof was prepared without the sulfuric acid treatment and re-dissolution operation. This solution had a pH of about 8. Next, the aqueous solution was formed into film in the same manner as in Example 5. The dried film obtained was water-insoluble and absorbed 520 times as much as its own weight of water.

EXAMPLE 7

The strength of the hydrated, sodium salt type gel obtained in Example 5 was compared with that of the hydrated gel obtained in Example 6. The results are shown in Table 4. It is apparent from the table that the gel in Example 5 is superior in gel strength irrespective of the larger value of the water absorption ability thereof.

Table 4

| | Water absorption ability | Gel strength (g/cm$^2$) |
|---|---|---|
| Gel (Example 5) | 800 | 140 |
| Gel (Example 6) | 520 | 100 |

Note:
The gel strength was determined as follows. The hydrated gel after saturation absorption of water, 20mm × 20mm × 1.5 - 2mm (thickness), was placed on a glass plate. A cylindrical rod of 0.4 $cm^2$ cross section was vertically placed on the gel and load was gradually applied at the top of the rod until the gel was broken. The gel strength was indicated by the load when the gel was just broken.

EXAMPLE 8

The hydrated, ammonium salt type gel, having a water absorption ability of 720, obtained in Example 3 was placed in a vessel made of 400 mesh stainless wire net. The water contained in the hydrated gel was removed in two ways by centrifugation at 45 and 160 gravity for 10 minutes, respectively, and the water-retaining ability under pressure of the gel was determined. The results are shown in Table 5 in comparison with the case of cellulosic fibers.

It is apparent from the table that the absorbent polymer of the present invention has excellent water-retaining properties.

Table 5

| | Water absorption percentage | | | |
|---|---|---|---|---|
| | atmospheric pressure | 45G | 160G | Remarks |
| Polymer (Example 3) | 720 | 570 | 480 | film dried at 100° C (Example 3) |
| Cellulosic fibers | 31 | 1.6 | 1.2 | Reference |

Note: Water absorption percentage
$$= \frac{\text{weight of said gel (cellulosic fibers) after saturation absorption of water-weight of water removed by centrifugation}}{\text{dry said gel (cellulosic fibers)}}$$

What is claimed is:

1. A method for the preparation of a water-insoluble hydrophilic gel comprising drying the saponified product of a copolymer of (1) a vinyl ester and (2) an ethylenically unsaturated carboxylic acid or derivative thereof, which is in a hydrated state, said saponified copolymer having at least one hydroxyl group and at least one carboxylato group, the degree of saponification of said vinyl ester (1) being at least 50 mole %, said ethylenically unsaturated carboxylic acid or derivative thereof (2) being present in an amount of 5 to 95 mole % of the copolymer and the saponification degree of (2) being at least 30 mole %, said hydrated state product having a water content of more than 100% by weight and said drying being to a water content of at most 50% by weight.

2. A method according to claim 1 wherein the copolymer has an intrinsic viscosity in benzene at 30° C of at least 1.5.

3. A method according to claim 1 wherein said copolymer contains said ethylenically unsaturated carboxylic acid or derivative thereof in an amount of 20 to 80 mole %.

4. A method according to claim 3 wherein said copolymer contains said ethylenically unsaturated carboxylic acid or derivative thereof in an amount of 30 to 70 mole %.

5. A method according to claim 1 wherein said vinyl ester is vinyl acetate, vinyl propionate of vinyl stearate.

6. A method according to claim 1 wherein (2) is an ethylenically unsaturated carboxylic ester, acrylamide or methacrylamide.

7. A method according to claim 1 wherein (2) is acrylic acid, methacrylic acid, crotonic acid, itaconic acid, maleic acid, fumaric acid, maleic anhydride, itaconic anhydride, esters thereof, acrylamide or methacrylamide.

8. A method according to claim 6 wherein (2) is methyl acrylate, ethyl acrylate, n-propyl acrylate, iso-propyl acrylate, n-butyl acrylate, tert-butyl acrylate, methyl methacrylate, ethyl methacrylate, n-propyl methacrylate, iso-propyl methacrylate, n-butyl methacrylate, tert-butyl methacrylate, acrylamide or methacrylamide.

9. A method according to claim 1 wherein the saponification degree of said vinyl ester contained in the saponified product of the copolymer is at least 90 mole %.

10. A method according to claim 8 wherein the saponification degree of (2) contained in the saponified product of the copolymer is at least 70 mole %.

11. A method according to claim 1 wherein all or substantially all of the carboxylic acid component in the saponified product is an alkali salt of the carboxylic acid.

12. A method according to claim 11 wherein the alkali salt is an alkali metal salt, ammonium salt or an organic amine salt.

13. A method according to claim 12 wherein the alkali metal salt a sodium or potassium salt.

14. A method according to claim 12 wherein the organic amine is mono-, di- or tri-methylamine, mono-, di- or tri-ethylamine, mono-, di- or tri-isopropylamine, mono-, di- or tri-ethanolamine, mono-, di- or tri-isopropanolamine, N,N-dimethylethanolamine, N,N-dimethylisopropanolamine, N,N-diethylethanolamine, N,N-diethylisopropanolamine, N-methylethanolamine, N-methylisopropanolamine, N-ethylethanolamine, cyclohexylamine, benzylamine, aniline or pyridine.

15. A method according to claim 1 which comprises (a) saponifying a copolymer of (1) a vinyl ester and (2) an ethylenically unsaturated carboxylic acid or derivative thereof with an alkali thereby producing a copolymer containing at least one hydroxyl group and one carboxylato group, (b) adjusting the pH of the aqueous solution of said saponified copolymer to not over about 3 thereby isolating a water-insoluble copolymer, (c) preparing an aqueous dispersion or solution of said isolated water-insoluble copolymer, adding an alkaline material to adjust the pH to about 4 to 12, controlling the water content to at least 100% by weight of the copolymer and (d) drying said aqueous solution until the water content of said copolymer is reduced to at most 50% by weight of the copolymer.

16. A method according to claim 15 wherein said pH in process (c) is 5 to 8.

17. A method according to claim 1 wherein said saponified product of a copolymer which is first in a hydrated state is molded and then dried.

18. A water-insoluble, hydrophilic gel obtained by the method of claim 1.

19. A water-insoluble, hydrophilic gel obtained by the method of claim 15.

20. A water-insoluble, hydrophilic gel comprising a water-insolubilized saponified product product of a copolymer of 5 to 95 mole % of (1) a vinyl ester and 95 to 5 mole % of (2) an ethylenically unsaturated carboxylic acid or derivative thereof, wherein the degree of saponification of said vinyl ester and said ethylenically unsaturated carboxylic acid or derivative thereof contained in the saponified product of the copolymer is at least 50 mole % and at least 30 mole %, respectively, said copolymer having an intrinsic viscosity in benzene at 30° C of at least 1.5, said water-insoluble hydrophilic gel having the properties of;
(1) water absorption ability: 10 to 1500;
(2) the product of the strength of said gel after saturation absorption of water and water absorption ability;
$5 \times 10^4$ to $20 \times 10^4$ (g/cm$^2$); and
(3) water retentability: at least 0.6.

21. A water-insoluble, hydrophilic gel according to claim 20 wherein said degree of saponification of said vinyl ester and said ethylenically unsaturated carboxylic acid or derivative thereof is at least 90 mole % and at least 70 mole %, respectively.

22. A water-insoluble, hydrophilic gel according to claim 20 wherein said copolymer contains an ethylenically unsaturated carboxylic acid or derivative thereof in an amount of 20 to 80 mole %.

23. A water-insoluble, hydrophilic gel according to claim 22 wherein said copolymer contains an ethylenically unsaturated carboxylic acid or derivative thereof in an amount of 30 to 70 mole %.

24. A water-insoluble, hydrophilic gel according to claim 20 wherein said vinyl ester is vinyl acetate, vinyl propionate or vinyl stearate.

25. A water-insoluble, hydrophilic gel according to claim 20 wherein (2) is an ethylenically unsaturated carboxylic ester, acrylamide or methacrylamide.

26. A water-insoluble, hydrophilic gel according to claim 20 wherein (2) is acrylic acid, methacrylic acid, crotonic acid, itaconic acid, maleic acid, fumaric acid, maleic anhydride, itaconic anhydride, esters thereof, acrylamide or methacrylamide.

27. A water-insoluble, hydrophilic gel according to claim 25 wherein (2) is methyl acrylate, ethyl acrylate, n-propyl acrylate, iso-propyl acrylate, n-butyl acrylate, tert-butyl acrylate, methyl methacrylate, ethyl methacrylate, n-propyl methacrylate, iso-propyl methacrylate, n-butyl methacrylate, tert-butyl methacrylate, acrylamide or methacrylamide.

28. A water-insoluble, hydrophilic gel according to claim 20 wherein all or substantially all of the carboxylic acid component in the saponified product is an alkali salt of the carboxylic acid.

29. A water-insoluble, hydrophilic gel according to claim 28 wherein the alkali salt is an alkali metal salt, ammonium salt or an organic amine salt.

30. A water-insoluble, hydrophilic gel according to claim 29 wherein the alkali metal salt is a sodium or potassium salt.

31. A water-insoluble, hydrophilic gel according to claim 29 wherein the organic amine is mono-, di- or tri-methylamine, mono-, di- or tri-ethylamine, mono-, di- or tri-isopropylamine, mono-, di- or tri-ethanolamine, mono-, di- or tri-isopropanolamine, N,N-dimethylethanolamine, N,N-dimethylisopropanolamine, N,N-diethylethanolamine, N,N-diethylisopropanolamine, N-methylethanolamine, N-methylisopropanolamine, N-ethylethanolamine, cyclohexylamine, benzylamine, aniline or pyridine.

32. A water-insoluble, hydrophilic gel according to claim 20 wherein the water absorption ability is 50 to 1000.

33. A method according to claim 1 wherein (2) is acrylic acid, methacrylic acid, crotonic acid, itaconic acid, maleic acid, fumaric acid, maleic anhydride, itaconic anhydride, methyl acrylate, ethyl acrylate, n-propyl acrylate isopropyl acrylate, n-butyl acrylate, tert-butyl acrylate, methyl methacrylate, ethyl methacrylate, n-propyl methacrylate, isopropyl methacrylate, n-butyl methacrylate, tert-butyl methacrylate, acrylamide or methacrylamide.

34. A method according to claim 33 wherein (1) is vinyl acetate, vinyl propionate or vinyl stearate.

* * * * *